United States Patent
Boitard et al.

(10) Patent No.: US 9,747,674 B2
(45) Date of Patent: Aug. 29, 2017

(54) METHOD AND DEVICE FOR CONVERTING AN IMAGE SEQUENCE WHOSE LUMINANCE VALUES BELONG TO A HIGH DYNAMIC RANGE

(71) Applicant: THOMSON LICENSING, Issy de Moulineaux (FR)

(72) Inventors: Ronan Boitard, Rennes (FR); Dominique Thoreau, Cesson Sevigne (FR); Yannick Olivier, Thorigne Fouillard (FR)

(73) Assignee: Thomson Licensing, Issy de Moulineaux (FR)

( * ) Notice: Subject to any disclaimer, the term of this patent is extended or adjusted under 35 U.S.C. 154(b) by 205 days.

(21) Appl. No.: 14/415,600

(22) PCT Filed: Jan. 29, 2013

(86) PCT No.: PCT/EP2013/051677
§ 371 (c)(1),
(2) Date: Jan. 18, 2015

(87) PCT Pub. No.: WO2014/012680
PCT Pub. Date: Jan. 23, 2014

(65) Prior Publication Data
US 2015/0178904 A1 Jun. 25, 2015

(30) Foreign Application Priority Data
Jul. 18, 2012 (FR) .................... 12 56925

(51) Int. Cl.
*G06T 5/00* (2006.01)

(52) U.S. Cl.
CPC .............. *G06T 5/009* (2013.01); *G06T 5/007* (2013.01); *G06T 2207/20208* (2013.01)

(58) Field of Classification Search
USPC ....................................... 382/274
See application file for complete search history.

(56) References Cited

U.S. PATENT DOCUMENTS 8,208,750 B2 * 6/2012 Fischer ............... G06T 5/001
348/222.1
8,270,759 B2 * 9/2012 El-Mahdy ............ G09G 5/02
382/162

(Continued)

FOREIGN PATENT DOCUMENTS

| EP | 1857975 | 11/2007 |
|---|---|---|
| GB | 2449272 | 11/2008 |
| KR | 2011048811 | 5/2011 |

OTHER PUBLICATIONS

Ramsey Jr et al: "Adaptive Temporal Tone Mapping"; Computer Graphics and Imaging 2004 (3), pp. 1-6.

(Continued)

*Primary Examiner* — Ishrat I Sherali
(74) *Attorney, Agent, or Firm* — Tutunjian & Bitetto, P.C.

(57) ABSTRACT

The invention relates to a method and a device for converting an original image sequence (SIO) whose luminance values belong to a given dynamic range, said method comprising a step of image-by-image dynamic range conversion during which a dynamic range conversion operator (TMO) is applied to the luminance component (Lw(i)) of each image of the original image sequence (SIO) to obtain a modified luminance component whose values belong to a lower dynamic range than that of the original image sequence (SIO). The method is characterized in that it also comprises a step of correction of the dynamic range during which the dynamic range of the values of the luminance component thus modified is reduced by a value calculated from a global characteristic of the original image sequence.

18 Claims, 3 Drawing Sheets

(56) References Cited

U.S. PATENT DOCUMENTS

Figure 1:
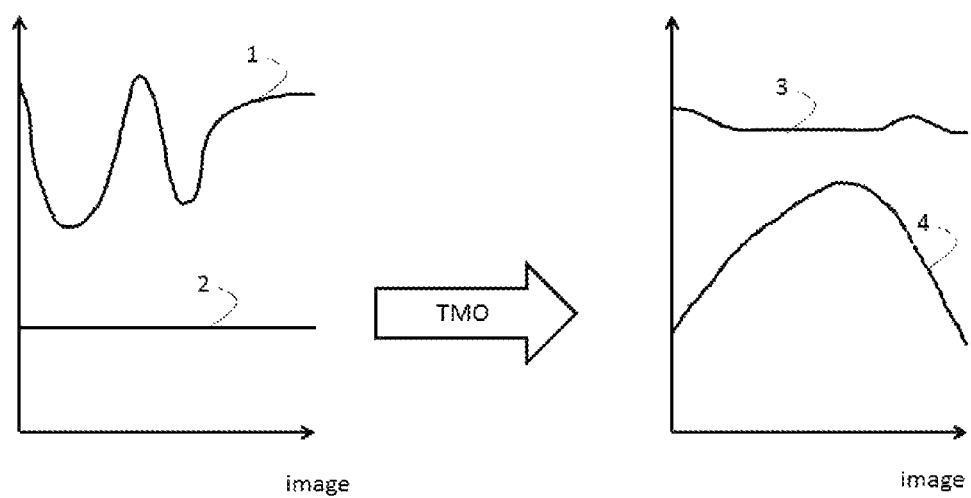

| | | | | |
|---|---|---|---|---|
| 8,577,169 | B2* | 11/2013 | Andrus | H04N 5/213 382/166 |
| 8,831,343 | B2* | 9/2014 | Kunkel | H04N 1/6088 382/167 |
| 9,275,445 | B2* | 3/2016 | Granados | G06T 5/009 |
| 9,489,726 | B2* | 11/2016 | Boitard | G06T 5/009 |
| 9,501,816 | B2* | 11/2016 | Li | G06T 5/007 |
| 2005/0117799 | A1 | 6/2005 | Fuh et al. | |
| 2010/0166301 | A1 | 7/2010 | Jeon | |

OTHER PUBLICATIONS

Guthier et al:"Flicker reduction in tone mapped high dynamic range video"; Proceedings of SPIE; vol. 7866, Jan. 23, 2011 (Jan. 23, 2011); pp. 1-16.

Kang et al:"High dynamic range video"; ACM Transactions on Graphics (TOG), vol. 22, No. 327 Jul. 2003 (Jul. 27, 2003), pp. 319-325.

Mantiuk et al:"Display adaptive tone mapping"; ACM SIGGRAPH 2008 Papers on, SIGGRAPH '08,2008, pp. 1-10.

Pardo et al:"Visualization of high dynamic range images"; IEEE Transactions on Image Processingi; vol. 12; n°6; 2003, pp. 639-647.

Reinhard et al:"Image display algorithms for high- and low-dynamic-range display devices"; Journal of the Society for Iniformation Display; vol. 15, No. 12, 2007, pp. 997-1014X.

Reinhard et al:"Photographic tone reproduction for digital images"; ACM Transactions on Graphics (TOG); vol. 21, No. 3, 2002, pp. 267-276.

Biswas et al: "A Simple Spatial Tone Mapping Operator for High Dynamic Range Images"; Sch. of Comput. Sci., Univ.; Thirteenth Color Imaging Conference. Color Science and Engineering Systems, Technologies, and Applications. Final Program and Proceedings; pp. 1-6.

Lakshmi et al: "Analysis of Tone mapping Operators on High Dynamic Range Images"; 2012 Proceedings of IEEE Southeastcon pp. 1-6; 2012; IEEE.

Qiuan et al: "A New Technique to Reproduced High-Dynamic-Range images for Low-Dynamic-Range display"; 2011 IEEE International Conference on Signal and Image Processing Application (ICSIPA 2011); pp. 399-403 ;2011; IEEE.

Lee et al: "Chromatic adaptation-based tone reproduction for high-dynamic-range imaging"; Optical Engineering; vol. 48, No. 10; pp. 107002-1-107002-8; Oct. 2009.

Search Report Dated May 14, 2013.

\* cited by examiner

METHOD AND DEVICE FOR CONVERTING AN IMAGE SEQUENCE WHOSE LUMINANCE VALUES BELONG TO A HIGH DYNAMIC RANGE

This application claims the benefit, under 35 U.S.C. §365 of International Application PCT/EP2013/051677, filed Jan. 29, 2013, which was published in accordance with PCT Article 21(2) on Jan. 23, 2014 in French and which claims the benefit of French patent application No. 1256925, filed Jul. 18, 2012.

1. FIELD OF THE INVENTION

The invention relates to the general field of converting the dynamic range of an image sequence.

The invention relates more specifically to a device and a method for converting an original image sequence whose luminance values belong to a given dynamic range to an image sequence whose luminance values belong to a lower dynamic range than that of the original image sequence.

2. PRIOR ART

It is known to use tone mapping operators (TMOs) or tone reproducers to convert the dynamic range of an original image acquired by a high dynamic range camera to an image whose dynamic range is lower (a low dynamic range image) so as to adapt the dynamic range of the original image sequence to that of a screen on which this image sequence is displayed. If the adapted original image sequence is intended for a display system, the luminance component of this adapted image sequence is quantised and encoded so as to be compatible with the display standards (BT 709, etc.). In this case, we usually refer to luma components rather than luminance components. The luminance, for its part, corresponds to a physical unit expressed in cd/m². The invention is equally applicable to a luminance component and a luma component.

One of these TMOs is that developed by Reinhard which is commonly called a PTR operator (Reinhard, E., Stark, M., Shirley, P., and Ferwerda, J., "Photographic tone reproduction for digital images," ACM Transactions on Graphics 21 (July 2002)).

The principle of this operator is to convert a luminance component $L_w$ of an original image to a modified luminance component $L_d$ of an image by using a sigmoid mapping curve given by equation (1):

$$L_d = \frac{L_s}{1+L_s} \cdot \left(1 + \frac{L_s}{L_{white}^2}\right) \quad (1)$$

where $L_{white}$ is a luminance value used to ignore zones with high luminance values, $L_d$ is a matrix whose size is that of the image and which comprises the values of the luminance component of the image which are expressed in a lower dynamic range than that of the original image and $L_s$ is a matrix whose size is that of the image and which comprises the values of a luminance component obtained by equation (2):

$$L_s = \frac{a}{k} \cdot L_w \quad (2)$$

where a is a chosen exposure value, and k, commonly called a key, a subjective indication of the overall brightness of the image given by equation (3):

$$k = \exp\left(\frac{1}{N} \cdot \sum_{i=1}^{N} \log(\delta + L_w(i))\right) \quad (3)$$

where N is the number of pixels in the image, $\delta$ is a value which avoids any singularity and $L_w$ (i) is the luminance value of a pixel of the luminance component $L_w$.

The values a and $L_{white}$ are two parameters of this TMO which are usually fixed, for example, at 18% for parameter a and at the maximum luminance value of the original image for parameter $L_{white}$.

The PTR operator provides satisfactory results for the conversion of dynamic range of fixed images. The same does not apply when the conversion relates to image sequences. In fact, if the key k changes from one image to another, the conversion curve (of sigmoid form) also changes, which results in different conversions for luminance values nevertheless similar in the original images. A flickering effect is thus visible in the modified images.

To resolve the problem of flickering, It is known to convert the luminance values of each image of an image sequence independently of the values of the other images of this image sequence and to choose, for each conversion of an image, a key according to the pixels of this image and the pixels of a predetermined number of images which temporally precede the image to be converted in the image sequence (Kang, S. B., Uyttendaele, M., Winder, S., and Szeliski, R., "High dynamic range video," in [ ACM SIGGRAPH 2003 Papers on—SIGGRAPH '03], 319, ACM Press, New York, N.Y., USA (2003)).

More specifically, the key is calculated from equation (3) wherein N is equal to the sum of the number of pixels in the image to be converted and the numbers of pixels in the images which temporally precede it in the image sequence.

This conversion method smoothes out the abrupt variations in the keys which may be produced during an image sequence. It therefore makes it possible to reduce flickering for image sequences which have small brightness variations.

However, for larger brightness variations, the method is no longer as effective as the smoothing uses images where the brightness conditions are different from the processed image.

It is also known to use methods wherein this number of preceding images is dynamically adapted according to the key of the current image and those of the preceding images (Ramsey, S., III, J. J., and Hansen, C., "Adaptive temporal tone mapping," Computer Graphics and Imaging—2004 (3), 3-7 (2004)).

It is also known to use methods which compare an original image using a visual response of the humans visual system (HVS) with an image whose luminance values belong to a dynamic range adapted to a screen (Mantiuk, R., Daly, S., and Kerofsky, L., "Display adaptive tone mapping," ACM Transactions on Graphics 27, 1 (August 2008)) which makes it possible to obtain an image whose visual perception on this screen is as little distorted as possible. A minimisation of a residual error between the results of the responses of the human visual system is calculated during these methods. This minimisation results in a conversion curve which is piece-wise linear and calculated image by image. This method is not therefore suitable for the conversion of an image sequence as the flickering effect previously mentioned is produced for certain image sequences.

To resolve this problem, it is known to apply a low-pass filter to the piece-wise conversion curve to smooth this curve. However, the minimisation of the image-by-image perceptual distortion is in this case deformed, causing a sub-optimal perception of the images of the image sequence thus modified.

Although these TMOs of the prior art provide satisfactory solutions for the conversion of dynamic range of fixed images, these operators are nevertheless not optimal for the conversion of dynamic range of image sequences as they introduce artefacts into the modified image sequences.

Although some of these TMOs reduce the flickering of modified images or even offer temporal adaptations to smooth the conversion curves, none offer a solution for preserving a coherency of perception of an object present in the images of an image sequence. Thus, the luminance of an object which is expressed in a high dynamic range and which is constant throughout an image sequence is converted into different luminance values which are expressed in a lower dynamic range when these TMOs are used. This problem is illustrated in FIG. 1. The left part diagrammatically shows the maximum luminance of an original image sequence whose luminance values belong to a given dynamic range (HDR), curve 1, and the luminance of an object present in this image sequence (curve 2). It can be noted that the luminance of the image sequence varies significantly during the sequence while that of the object is constant. The right part shows the maximum of the modified luminance values, curve 3, and the modified luminance values of the object following application of a TMO to the original image sequence. It is noted in this example that the constant luminance of the object (curve 2) corresponds to different modified luminance values which have a high variability (curve 4) and that the high variability of the maximum luminance of the image sequence (curve 1) corresponds to an almost constant modified luminance value (curve 3). The use of a TMO which acts independently on each of the images of the image sequence therefore causes a change in the perception of the object present in the image sequence.

Moreover, the overall brightness of the images of the image sequence is not preserved throughout the image sequence.

3. SUMMARY OF THE INVENTION

The purpose of the invention is to overcome at least one of the disadvantages of the prior art.

For this purpose, the invention relates to a method and a device for converting an original image sequence whose luminance values belong to a given dynamic range. The method comprising a step of image-by-image dynamic range conversion during which a dynamic range conversion operator is applied to the luminance component of each image of the original image sequence to obtain a modified luminance component whose values belong to a lower dynamic range than that of the original image sequence, the method is characterised in that it also comprises a step of correction of the dynamic range during which the dynamic range of the values of the luminance component thus modified is reduced by a value calculated from a global characteristic of the original image sequence.

4. LIST OF FIGURES

Figure 2:
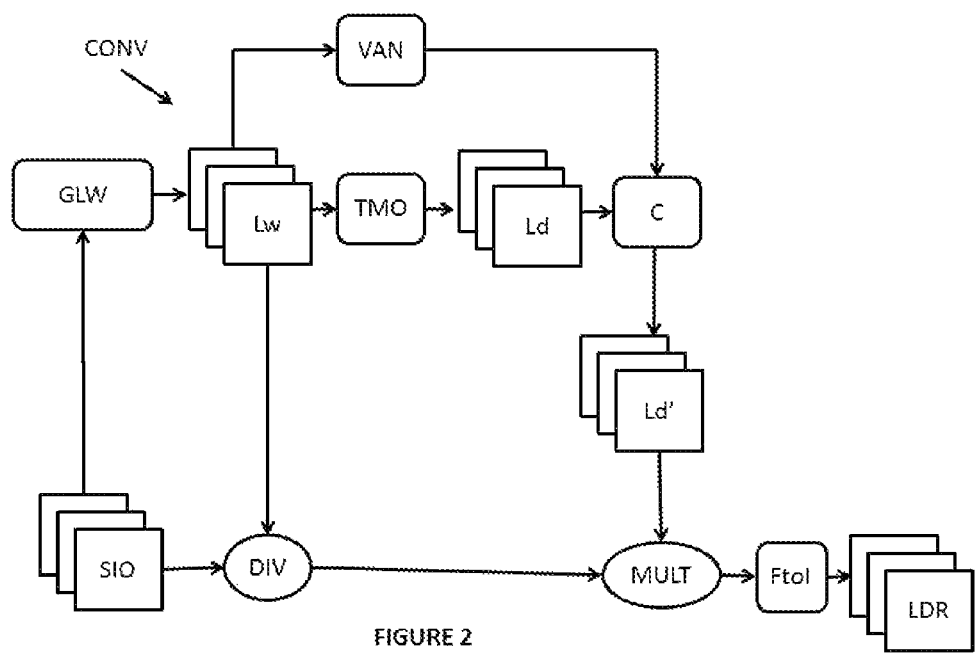
Figure 3:
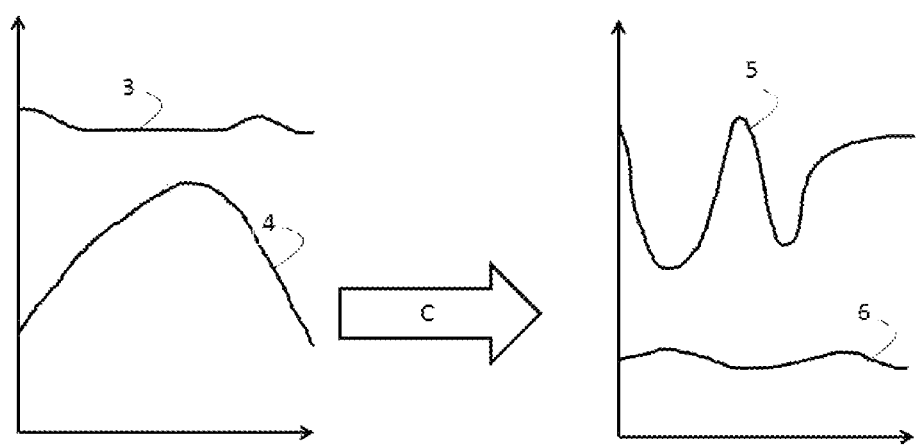

The invention will be better understood and illustrated by means of non-restrictive embodiments and advantageous implementations, with reference to the accompanying drawings, wherein:

FIG. 1 diagrammatically shows the change in perception of an object in an image sequence following the application of a TMO;

FIG. 2 shows a block diagram of an image sequence conversion device which implements an image sequence conversion method according to the invention; and FIG. 3 diagrammatically shows the change in perception of an object in an image sequence following the application of a TMO;

5. DETAILED DESCRIPTION OF THE INVENTION

The invention relates to a device CONV for converting an original image sequence SIO whose luminance values belong to a given dynamic range (HDR) to an image sequence whose luminance values belong to a lower dynamic range (LDR) than that of the original image sequence SIO. This is usually referred to as HDR to LDR dynamic range correction.

FIG. 2 shows a block diagram of such an image sequence conversion device which implements an image sequence conversion method according to the invention.

In FIG. 2, the modules shown are functional units that may or may not correspond to physically distinguishable units. For example, these modules or some of them can be grouped together in a single component or circuit, or constitute functions of the same software. On the contrary, some modules may be composed of separate physical entities. The conversion device compatible with the invention is implemented according to a purely hardware embodiment, for example in the form of a dedicated component (for example in an ASIC (application specific integrated circuit) or FPGA (field-programmable gate array) or VLSI (very large scale integration) or of several electronic components integrated into a device or even in the form of a mixture of hardware elements and software elements.

Device CONV comprises a dynamic range conversion operator TMO which is applied to luminance component Lw of each image of the original image sequence SIO to obtain a modified image Ld whose luminance values Ld(i) belong to a lower dynamic range LDR than that of image to be converted (HDR).

In the case of a colour image sequence SIO, the device CONV comprises means GLW for obtaining the luminance component Lw from each colour image of the image sequence SIO. For example if an image of the image sequence SIO is expressed in an (R,G,B) colour space, the image is transformed in order to be expressed in the (X,Y,Z) colour space so as to recover the Y channel of the (X,Y,Z) space which forms the luminance component Lw. It is widely known to use such colour space transformation means. Other examples of means GLW can be used without leaving the scope of the invention. Device CONV also comprises means DIV and MULT for the purpose of conserving a constant saturation and the hue of the colours. These means DIV are configured to divide the R, G and B colour components corresponding to a colour image of the image sequence SIO by component Lw and means MULT are configured to multiply the R, G and B colour components thus modified by the modified luminance component Ld. The three components originating from this multiplication are then expressed in floating values. To obtain a modified image LDR, these three components originating from this multiplication are submitted at the input of means Ftol of device CONV and undergo a conversion of their values to whole values which belong to a dynamic range for the screen on which the modified colour image must be displayed.

The TMO may be any TMO of the prior art which is applied to a fixed image or independently to each of the images of an image sequence. The PTR operator described in the introductory section can for example be used. In this case, the modified luminance component Ld is obtained from equation (1) given in the introductory section.

According to the invention, the conversion device also comprises means for correcting the dynamic range represented on the diagram by modules C and means VAN for obtaining characteristics of the luminance component Lw. These means are configured so that during the conversion method, the dynamic range of the values of the luminance component thus modified Ld is reduced by a value calculated from a global characteristic of the image sequence SIO.

According to an embodiment, the reduced dynamic range luminance component L'd is the given by equation (5):

$$L'_d = R \cdot L_d \tag{5}$$

where R is a real value.

This embodiment is particularly advantageous for modifying the image sequence luminance component representing a fade to a single colour which is often white or black.

In fact a fade starting from an image $I_0^f$ to of an image sequence S and stopping at an image $I_{i+M}^f$ of the image sequence S can be expressed by equation (6):

$$I_i^f = \alpha_i \cdot I_0^f + I^b(1-\alpha_i) \tag{6}$$

where $I^b$ is an image of the final single colour of the fade (often white or black), $$\alpha_i = \frac{i}{M}$$

where $0 \le i \le 1$ is a value which controls the duration of the fade, and M is the number of images between the first image $I_0^f$ of the fade and the last image $I_{i+M}^f$ of this fade.

According to a variant, the number M is defined so that the duration of the fade of the modified image sequence is equal to that of the original image sequence S.

This variant is particularly advantageous as the visual appearance of the fade of the original image sequence S is thus preserved.

According to an embodiment, the reduced dynamic range luminance component L'd is the given by equation (7):

$$L'_d = (x + (1-x) \cdot R) L_d \tag{7}$$

where R is a real value and x is an offset in the reduction value fixed for example by a user.

This variant makes it possible to modify the gradient of the reduction function when the reduction value is too small.

According to an embodiment, the characteristic of the image sequence SIO expresses a level of brightness of the image sequence SIO.

According to an embodiment, the level of brightness of the image sequence SIO is given by a key kv which is calculated using equation (3) for a value N equal to the sum of the numbers of pixels of all the images of the sequence SIO.

According to an embodiment, the dynamic range of the values of the modified luminance component is reduced by a value also calculated using a characteristic of the image to be converted.

According to an embodiment, the characteristic of the image to be converted is the level of brightness of this image.

According to an embodiment, this level of brightness of this image is given by a key kp which is calculated using equation (3) for a value N equal to the number of pixels of this image.

According to an embodiment which corresponds to the particular case where the TMO is a PTR operator, the value R is given by equation (8):

$$R = \frac{k_p}{k_p + k_v} \tag{8}$$

This latter embodiment makes it possible to preserve the perception of an object present in the image sequence SIO and to ensure the temporal coherency of the brightness between the images of the image sequence SIO.

According to an embodiment, the value R is given by equation (9):

$$\frac{k_i^{HDR} \cdot k_{i,max}^{LDR}}{k_{i,max}^{HDR} \cdot k_i^{LDR}} \tag{9}$$

where $k_i^{HDR}$ is the key of the luminance component of the image to be converted of the image sequence SIO, $k_{i,max}^{HDR}$ is the maximum key chosen from among the keys of the luminance components of the original images of the image sequence SIO, $k_i^{LDR}$ is the key of the modified luminance component Ld of the image to be converted and $k_{i,max}^{LDR}$ is the maximum key chosen from among the keys of the modified luminance components Ld originating from the image sequence SIO.

According to an embodiment, the value R is given by equation (9):

$$\frac{k_i^{HDR} \cdot k_{i,min}^{LDR}}{k_{i,min}^{HDR} \cdot k_i^{LDR}}$$

where $k_i^{HDR}$ is the key of the luminance component of the image to be converted of the image sequence SIO, $k_{i,min}^{HDR}$ is the minimum key chosen from among the keys of the luminance components of the original images of the image sequence SIO, $k_i^{LDR}$ is the key of the modified luminance component Ld of the image to be converted and $k_{i,min}^{LDR}$ is the minimum key chosen from among the keys of the modified luminance components Ld originating from the image sequence SIO.

These last two embodiments are particularly advantageous as any type of TMO which is applied image by image can be used and because it ensures the temporal coherency of the brightness between the images of the image sequence SIO. Moreover, the first (respectively the second) of these last two embodiments is particularly advantageous for modifying the luminance component of an image sequence representing a fade to the colour black (respectively white) when the reduced dynamic range luminance component L'd is given by equation (5).

FIG. 3 shows an example of results provided by the invention.

The left part shows the curves of the right part of FIG. 1. The right part shows the maximum values of the components L'd from the image sequence (curve 5) once corrected by means C and the corrected luminance values of the object (curve 6). It may be noted that the variations in the values L'd(i) of the object have been reduced thus enabling a stability in the perception of the object throughout the image sequence SIO. Moreover, the variations of the maximum luminance values L'd(i) are comparable to those of the original image despite the reduction in the dynamic of the value ranges. This makes it possible to preserve the coherency of the brightness throughout the image sequence.

The invention claimed is:

1. A method for converting an original image sequence whose luminance values belong to a given dynamic range, said method comprising:
   converting, image-by-image, the dynamic range of the luminance component of each image of the original image sequence by applying a dynamic range conversion operator to the luminance component of each image of the original image sequence to obtain a modified luminance component whose values belong to a lower dynamic range than that of the original image sequence, wherein it also comprises:
   correcting the dynamic range of the values of the luminance component thus modified by reducing it by a value calculated from a global characteristic of the original image sequence.

2. The method according to claim 1, wherein the reduced dynamic range luminance component L'd is given by:

$$L'_d = R \cdot L_d$$

where R is a real value.

3. The method according to claim 1, wherein the reduced dynamic range luminance component L'd is given by:

$$L'_d = (x + (1-x) \cdot R) L_d$$

where R is a real value and x is an offset in the reduction value fixed for example by a user.

4. The method according to claim 2, wherein the characteristic of the original image sequence expresses a level of brightness of the original image sequence.

5. The method according to claim 1, wherein the dynamic range of the values of the modified luminance component is reduced by a value also calculated using a characteristic of the image to be converted.

6. The method according to claim 5, wherein the characteristic of the image to be converted is the level of brightness of this image.

7. The method according to claim 1, wherein the dynamic range conversion operator (TMO) is a Reinhard operator, the value R is given by:

$$R = \frac{k_p}{k_p + k_v}$$

where $k_p$ is a value, called a key, which is calculated from the pixels of an image and $k_v$ is a value, called a key, which is calculated from all the pixels of all the images of the original image sequence.

8. The method according to claim 2, wherein the value R is given by:

$$\frac{k_i^{HDR} \cdot k_{i,max}^{LDR}}{k_{i,max}^{HDR} \cdot k_i^{LDR}}$$

where $k_i^{HDR}$ is a value, called a key, which is calculated from the luminance component of the image to be converted of the original image sequence, $k_{i,max}^{HDR}$ is a maximum value chosen from among the keys of the luminance components of the original images of the original image sequence, $k_i^{LDR}$ is a value, called a key, which is calculated from modified luminance component of the image to be converted and $k_{i,max}^{LDR}$ is a maximum value chosen from among the keys of the modified luminance components originating from the original image sequence.

9. The method according to one of claim 2, wherein the value R is given by:

$$\frac{k_i^{HDR} \cdot k_{i,min}^{LDR}}{k_{i,min}^{HDR} \cdot k_i^{LDR}}$$

where $k_i^{HDR}$ is a value, called a key, which is calculated from the luminance component of the image to be converted of the original image sequence, $k_{i,min}^{HDR}$ is a minimum value chosen from among the keys of the luminance components of the original images of the original image sequence, $k_i^{LDR}$ is a value, called a key, which is calculated from the modified luminance component of the image to be converted and $k_{i,min}^{LDR}$ is a minimum value chosen from among the keys of the modified luminance components originating from the original image sequence.

10. A device for converting an original image sequence whose luminance values belong to a given dynamic range, said device comprising a processor configured to:
   convert, image-by-image, the dynamic range of the luminance component of each image of the original image sequence by applying a dynamic range conversion operator to the luminance component of each image of the original image sequence to obtain a modified luminance component whose values belong to a lower dynamic range than that of the original image sequence, wherein the processor is further configured to:
   correct the dynamic range of the values of the luminance component thus modified by reducing it by a value calculated from a global characteristic of the original image sequence.

11. The device according to claim 10, wherein the reduced dynamic range luminance component $L'_d$ is given by:

$$L'_d = R \cdot L_d$$

where R is a real value.

12. The device according to claim 10, wherein the reduced dynamic range luminance component $L'_d$ is given by:

$$L'_d = (x + (1-x) \cdot R) L_d$$

where R is a real value and x is an offset in the reduction value fixed for example by a user.

13. The device according to claim 11, wherein the characteristic of the original image sequence expresses a level of brightness of the original image sequence.

14. The device according to claim 10, wherein the dynamic range of the values of the modified luminance component is reduced by a value also calculated using a characteristic of the image to be converted.

15. The device according to claim 14, wherein the characteristic of the image to be converted is the level of brightness of this image.

16. The device according to claim 11, wherein the dynamic range conversion operator is a Reinhard operator, the value R is given by:

$$R = \frac{k_p}{k_p + k_v}$$

where $k_p$ is a value, called a key, which is calculated from the pixels of an image and $k_v$ is a value, called a key, which is calculated from all the pixels of all the images of the original image sequence.

17. The device according to one of claim 11, wherein the value R is given by:

$$\frac{k_i^{HDR}, k_{i,max}^{LDR}}{k_{i,max}^{HDR}, k_i^{LDR}}$$

where $k_i^{HDR}$ is a value, called a key, which is calculated from the luminance component of the image to be converted of the original image sequence, $k_{i,min}^{HDR}$ is a maximum value chosen from among the keys of the luminance components of the original images of the original image sequence, $k_i^{LDR}$ is a value, called a key, which is calculated from modified luminance component of the image to be converted and $k_{i,max}^{LDR}$ is a maximum value chosen from among the keys of the modified luminance components originating from the original image sequence.

18. The device according to one of claim 11, wherein the value R is given by:

$$\frac{k_i^{HDR}, k_{i,min}^{LDR}}{k_{i,min}^{HDR}, k_i^{LDR}}$$

where $k_i^{HDR}$ is a value, called a key, which is calculated from the luminance component of the image to be converted of the original image sequence, $k_{i,min}^{HDR}$ is a minimum value chosen from among the keys of the luminance components of the original images of the original image sequence, $k_i^{LDR}$ is a value, called a key, which is calculated from modified luminance component of the image to be converted and $k_{i,max}^{LDR}$ is a minimum value chosen from among the keys of the modified luminance components originating from the original image sequence.

* * * * *